(12) United States Patent
Venugopal et al.

(10) Patent No.: US 8,677,970 B2
(45) Date of Patent: Mar. 25, 2014

(54) PISTON FOR INTERNAL COMBUSTION ENGINE

(75) Inventors: Rishikesh Venugopal, Indianapolis, IN (US); Donald W. Stanton, Columbus, IN (US); Bhargav Ranganath, Columbus, IN (US); Thomas Geyer, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 0 days.

(21) Appl. No.: 13/422,992

(22) Filed: Mar. 16, 2012

(65) Prior Publication Data

US 2012/0234285 A1 Sep. 20, 2012

Related U.S. Application Data

(60) Provisional application No. 61/453,858, filed on Mar. 17, 2011.

(51) Int. Cl.
*F02F 3/00* (2006.01)

(52) U.S. Cl.
USPC .................................... 123/193.6; 123/193.1

(58) Field of Classification Search
USPC .......................................... 123/193.6, 192.1
See application file for complete search history.

(56) References Cited

U.S. PATENT DOCUMENTS

| | | | |
|---|---|---|---|
| 1,865,841 A | 7/1932 | Cummins | |
| 2,709,992 A | 6/1955 | Graves | |
| 2,866,445 A | 12/1958 | Graves | |
| 3,020,900 A | 2/1962 | Hoffmann | |
| 3,240,193 A | * 3/1966 | Ephraim, Jr. et al. | ...... 123/41.35 |
| 3,420,193 A | * 1/1969 | Austgen | ........................ 105/422 |
| 3,508,531 A | 4/1970 | Squinto et al. | |
| 3,543,735 A | 12/1970 | Kruckenburg | |
| 3,805,677 A | 4/1974 | Clary et al. | |
| 3,963,001 A | 6/1976 | Kruckenberg et al. | |
| 4,056,044 A | 11/1977 | Kamman et al. | |
| 4,122,804 A | 10/1978 | Kingsbury et al. | |
| 4,161,165 A | 7/1979 | Belush et al. | |
| 4,180,027 A | 12/1979 | Taylor | |
| 4,221,190 A | 9/1980 | Komiyama et al. | |
| 4,242,948 A | 1/1981 | Stang et al. | |

(Continued)

FOREIGN PATENT DOCUMENTS

DE  1301657  8/1969
DE  37 42 574 C1  3/1989

(Continued)

OTHER PUBLICATIONS

Notification of transmittal of the International Search Report and the Written Opinion of the International Searching Authority, or the Declaration dated Jun. 13, 2012; International Application No. PCT/US 12/29519.

*Primary Examiner* — Noah Kamen
*Assistant Examiner* — Long T Tran
(74) *Attorney, Agent, or Firm* — Faegre Baker Daniels LLP

(57) ABSTRACT

A piston and an engine are provided that includes various precise configuration parameters, including dimensions, shape and/or relative positioning of combustion chamber features. More particularly, configuration parameters for a piston crown and a piston bowl located within the piston crown are provided. The piston bowl configuration results in a combustion process that yields decreased heat transfer to a cylinder head of the internal combustion engine as well as reduced NOx emissions.

20 Claims, 4 Drawing Sheets

(56) References Cited

U.S. PATENT DOCUMENTS

| | | | |
|---|---|---|---|
| 4,286,505 | A | 9/1981 | Amdall |
| 4,377,967 | A | 3/1983 | Pelizzoni |
| 4,440,125 | A | 4/1984 | Case |
| 4,531,502 | A | 7/1985 | Mizuhara |
| 4,543,929 | A | 10/1985 | Kataoka et al. |
| 4,662,319 | A | 5/1987 | Ayoul |
| 4,759,323 | A | 7/1988 | August |
| 4,779,587 | A | 10/1988 | Schweinzer et al. |
| 4,781,159 | A | 11/1988 | Elsbett et al. |
| 4,909,132 | A | 3/1990 | Kling et al. |
| 4,989,559 | A | 2/1991 | Fletcher-Jones |
| 5,000,144 | A | 3/1991 | Schweinzer et al. |
| 5,020,485 | A | 6/1991 | Watanabe |
| 5,029,563 | A | 7/1991 | Hu |
| 5,040,454 | A | 8/1991 | Ballheimer et al. |
| 5,099,809 | A | 3/1992 | Kawatani et al. |
| 5,121,722 | A | 6/1992 | Horiuchi |
| 5,215,052 | A | 6/1993 | Augustin |
| 5,299,738 | A | 4/1994 | Genter et al. |
| 5,305,720 | A | 4/1994 | Ando et al. |
| 5,320,075 | A | 6/1994 | Regueiro |
| 5,322,042 | A | 6/1994 | Di Priolo et al. |
| 5,363,820 | A | 11/1994 | Neitz |
| 5,373,820 | A | 12/1994 | Sakamoto et al. |
| 5,445,323 | A | 8/1995 | Perr et al. |
| 5,555,867 | A | 9/1996 | Freen |
| 5,692,468 | A | 12/1997 | Haman et al. |
| 5,868,112 | A * | 2/1999 | Mahakul et al. .............. 123/263 |
| 5,927,244 | A | 7/1999 | Yamauchi et al. |
| 5,983,853 | A | 11/1999 | Roessler et al. |
| 6,161,518 | A | 12/2000 | Nakakita et al. |
| 6,314,933 | B1 | 11/2001 | Iijima et al. |
| 6,382,176 | B1 | 5/2002 | Cobb, Jr. |
| 6,499,457 | B2 | 12/2002 | Suzuki et al. |
| 6,508,226 | B2 | 1/2003 | Tanaka et al. |
| 6,725,828 | B1 * | 4/2004 | Han et al. ..................... 123/295 |
| 6,732,703 | B2 | 5/2004 | Eckerle et al. |
| 6,799,550 | B2 | 10/2004 | Wirth |
| 6,935,301 | B2 | 8/2005 | Liu |
| 6,966,294 | B2 | 11/2005 | Eckerle et al. |
| 6,997,158 | B1 | 2/2006 | Liu |
| 7,025,031 | B2 | 4/2006 | Mahakul et al. |
| 7,185,614 | B2 | 3/2007 | Meffert et al. |
| 7,210,448 | B2 | 5/2007 | Stanton et al. |
| 7,389,764 | B1 | 6/2008 | Wickman et al. |
| 7,431,012 | B1 | 10/2008 | Glenn et al. |
| 2002/0000216 | A1 | 1/2002 | Ismailov |
| 2003/0213461 | A1 * | 11/2003 | Regueiro ...................... 123/262 |
| 2003/0226538 | A1 * | 12/2003 | Eckerle et al. ................ 123/298 |
| 2005/0092279 | A1 * | 5/2005 | Parker et al. ................ 123/193.6 |
| 2006/0070603 | A1 * | 4/2006 | Stanton et al. ................ 123/298 |
| 2006/0090726 | A1 | 5/2006 | Meffert et al. |
| 2007/0261663 | A1 | 11/2007 | Lineton et al. |

FOREIGN PATENT DOCUMENTS

| | | |
|---|---|---|
| DE | 100 28 449 A1 | 7/2001 |
| EP | 0071994 A1 | 2/1983 |
| EP | 0589178 A1 | 3/1994 |
| EP | 0 810 365 A1 | 12/1997 |
| FR | 1217467 A | 5/1960 |
| GB | 465565 | 5/1937 |
| GB | 713637 | 5/1954 |
| GB | 2075147 A | 11/1981 |
| GB | 2079851 A | 1/1982 |
| GB | 2 394 997 A | 5/2004 |
| JP | 51-113007 A | 10/1976 |
| JP | 50-000090 A | 1/1980 |
| JP | 59-134322 A | 8/1984 |
| JP | 59-155551 A | 9/1984 |
| JP | 60-17223 A | 1/1985 |
| JP | 60-32929 A | 2/1985 |
| JP | 60-135651 A | 7/1985 |
| JP | H3-149315 A | 6/1991 |
| JP | H4-31651 A | 2/1992 |
| JP | 2002-122024 A | 4/2002 |
| SU | 1107870 A1 | 8/1984 |
| WO | 2008/082330 A1 | 7/2008 |

\* cited by examiner

PISTON FOR INTERNAL COMBUSTION ENGINE

CROSS-REFERENCE TO RELATED APPLICATIONS

This application claims the benefit of priority to U.S. Provisional Patent Application No. 61/453,858, filed on Mar. 17, 2011, which is hereby incorporated by reference in its entirety.

TECHNICAL FIELD

This disclosure relates to the geometry of piston bowls for pistons of internal combustion engines.

BACKGROUND

Internal combustion engine designers have been challenged to improve fuel efficiency and decrease emissions to meet government regulations and customer expectations. One way of accomplishing both increased fuel efficiency and decreased emissions is to increase the efficiency of burning fuel in the combustion chambers of internal combustion engines.

Customers also demand improved life and reliability of internal combustion engines. The high temperature in the combustion chamber of internal combustion engines puts significant stress on the cylinder head of an internal combustion engine, reducing the life of the cylinder head and components installed in the cylinder head.

If mixing of fuel and air or oxygen could be improved and accomplished in a portion of the combustion chamber that is away from the cylinder head, improved engine efficiency and decreased particulate matter emissions could be realized. In addition, the stress from combustion temperatures on the cylinder head could be reduced, improving the reliability of the cylinder head.

SUMMARY

This disclosure provides an internal combustion engine comprising an engine body, a cylinder head, a combustion chamber, and a piston. The cylinder head is attached to the engine body. The combustion chamber is positioned between the cylinder head and the engine body. The piston is located in the engine body and includes a piston crown that forms a portion of the combustion chamber. The piston crown includes a central axis, a plurality of valve pockets, and a piston bowl. The plurality of piston pockets is arranged about the periphery of the piston crown in a plane perpendicular to the central axis. The piston bowl is positioned radially inward from the valve pockets. The piston bowl includes a compound radius, a frustoconical outer floor portion, an annular outer bowl portion, and a spray-targeting feature. The compound radius includes a radius R1. Radius R1 includes a center of radius at a radial distance L1 from the central axis of the piston. Radius R1 is connected to and extends inwardly from the valve pockets. The frustoconical outer floor portion is connected to the compound radius and extends a distance L4 from the compound radius at an angle α1 to a plane perpendicular to the central axis. The annular outer bowl portion includes a radius R5. The spray-targeting feature is positioned between the annular outer bowl portion and the frustoconical outer floor portion and includes a radius R3 with a center of radius located at an axial distance H3 from the valve pockets.

This disclosure also provides an internal combustion engine comprising an engine body, a cylinder head, a combustion chamber, and a piston. The cylinder head is attached to the engine body. The combustion chamber is positioned between the cylinder head and the engine body. The piston, which is located in the engine body, includes a piston crown that forms a portion of the combustion chamber. The piston crown includes a central axis, a plurality of valve pockets, and a piston bowl. The plurality of valve pockets is arranged about the periphery of the piston crown in a plane perpendicular to the central axis. The piston bowl is positioned radially inward from the valve pockets. The piston bowl includes a compound radius, a frustoconical outer floor portion, and a spray-targeting feature. The compound radius includes a radius R1. Radius R1 includes a center of radius at a radial distance L1 from the central axis. Radius R1 is connected to and extends radially inwardly from the valve pockets. The frustoconical outer floor portion is connected to the compound radius and extends a distance L4 from the compound radius at an angle α1 to a plane perpendicular to the central axis. The spray-targeting feature is positioned between the annular outer bowl portion and the frustoconical outer floor portion and includes a radius R3 with a center of radius located at an axial distance H3 from the end surface. A ratio L4/R3 is in the range of 0.2 to 3.0 and the ratio H3/L1 is in the range of 0.15 to 0.3.

This disclosure also provides an internal combustion engine comprising an engine body, a cylinder head, a combustion chamber and a piston. The cylinder head is attached to the engine body. The combustion chamber is positioned between the cylinder head and the engine body. The piston is located in the engine body and includes a piston crown that forms a portion of the combustion chamber. The piston crown includes a central axis, a plurality of valve pockets, and a piston bowl. The plurality of valve pockets is arranged about the periphery of the piston crown in a plane perpendicular to the central axis. The piston bowl is positioned radially inward from the valve pockets. The piston bowl includes a compound radius, a frustoconical outer floor portion, an annular outer bowl portion, a spray-targeting feature, and a ski jump feature. The compound radius is connected to and extends radially inward from the valve pockets. The frustoconical outer floor portion is connected to the compound radius and extends from the compound radius at an angle α1 to a plane perpendicular to the central axis. The annular outer bowl portion includes a radius R5. The spray-targeting feature is positioned between the annular outer bowl portion and the frustoconical outer floor portion. The ski jump feature is positioned between the annular outer bowl portion and the central axis and is connected to the annular outer bowl portion. The ski jump feature includes a radius R4 and a ratio R4/R5 is in the range of 2.5 to 5.0.

Advantages and features of the embodiments of this disclosure will become more apparent from the following detailed description of exemplary embodiments when viewed in conjunction with the accompanying drawings.

DETAILED DESCRIPTION

Figure 1:
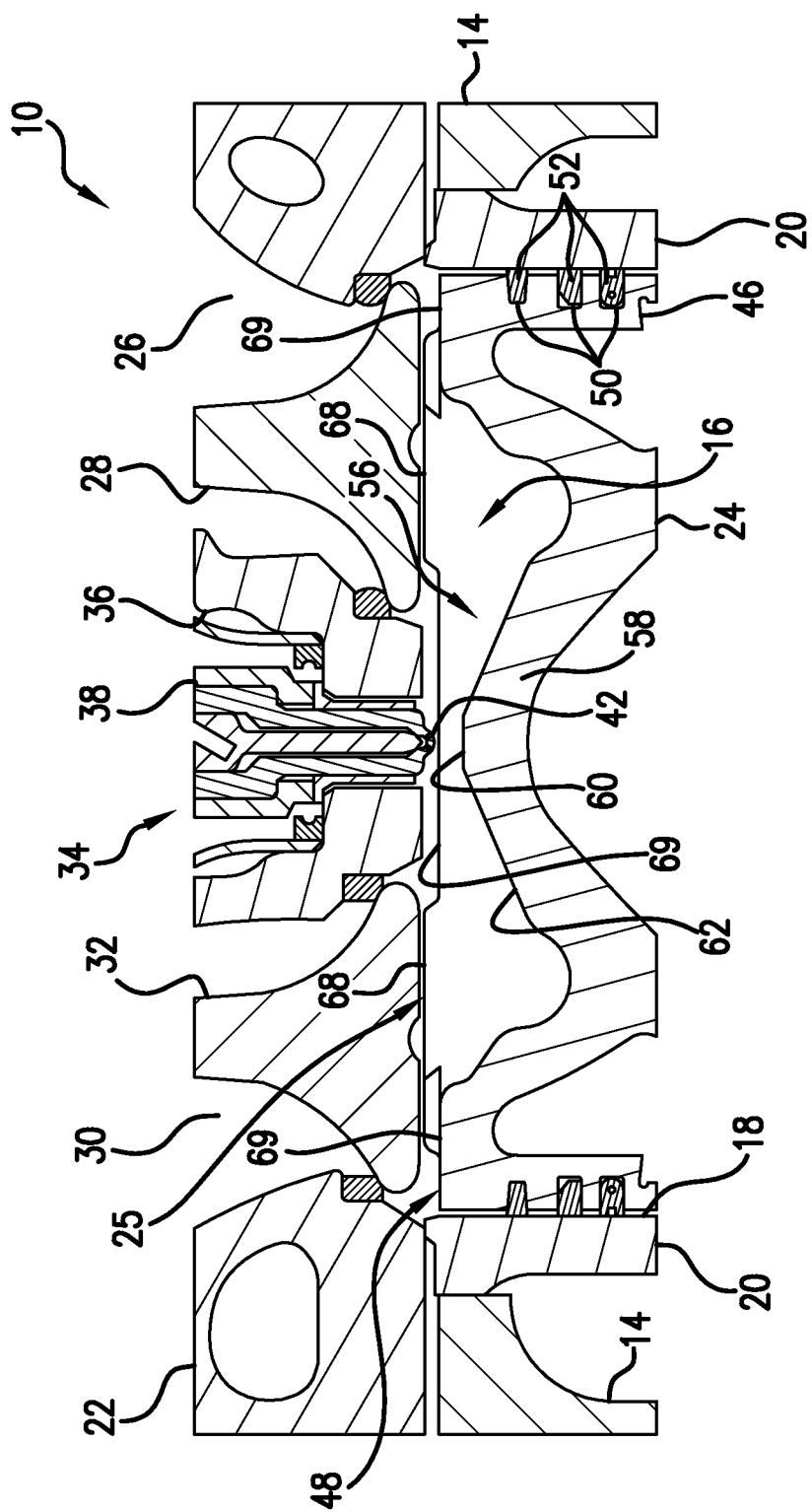
FIG. 1 is a sectional view of a portion of a combustion chamber of an internal combustion engine in accordance with an exemplary embodiment of the present disclosure.

Referring to FIG. 1, the present disclosure is directed to an internal combustion engine, a portion of which is shown in a cross sectional view and generally indicated at 10. Engine 10 is capable of producing emissions, e.g., NOx and particulates, at levels lower than the emissions levels produced by conventional engines. As discussed hereinbelow, engine 10 includes various precise configuration parameters resulting in a combustion process that achieves desired combustion characteristics for producing reduced emission levels. The configuration of engine 10 also provides a reduced temperature at a cylinder head 22 of engine 10, improving the life and reliability of cylinder head 22.

Engine 10 includes an engine body or block 14, a small portion of which is shown, and at least one combustion chamber 16. Of course, engine 10 may contain a plurality of combustion chambers, for example four, six or eight, which may be arranged in a line or in a "V" configuration. Each combustion chamber 16 is formed at one end of a cylinder cavity 18, which may be formed directly in engine body 14. Cylinder cavity 18 may be adapted to receive a removable cylinder liner 20, which is only partially shown in FIG. 1.

Engine 10 also includes a cylinder head 22 that attaches to engine body 14 to close cylinder cavity 18. Engine 10 further includes a piston 24 positioned for reciprocal movement within each cylinder liner 20 in association with each combustion chamber 16. Although only a top portion of piston 24 is shown in FIG. 1, piston 24 may be any type of piston so long as it contains the features identified hereinbelow necessary for accomplishing the present disclosure. For example, piston 24 may be an articulated piston or a single piece piston.

An upper surface or top face 25 of piston 24 cooperates with cylinder head 22 and the portion of cylinder liner 20 extending between cylinder head 22 and piston 24 to define combustion chamber 16. Although not specifically illustrated, piston 24 connects to a crankshaft of engine 10 by way of a connecting rod that causes piston 24 to reciprocate along a rectilinear path within cylinder liner 20 as the engine crankshaft rotates. FIG. 1 illustrates the position of piston 24 in a top dead center (TDC) position achieved when the crankshaft is positioned to move piston 24 to the furthest most position away from the rotational axis of the crankshaft. In a conventional manner, piston 24 moves from the TDC position to a bottom dead center (BDC) position when advancing through the intake and power strokes. For purposes of this disclosure, the words "outward" and "outwardly" correspond to the direction away from the engine crankshaft and the words "inward" and "inwardly" correspond to the direction toward the engine crankshaft or the BDC position of piston 24.

Engine 10 of the present disclosure may be a four-cycle compression ignition (diesel) engine employing direct injection of fuel into each combustion chamber 16. An intake passage 26 formed in cylinder head 22 selectively directs intake air into combustion chamber 16 by means of a pair of poppet valves 28 positioned in cylinder head 22, only one of which is illustrated in FIG. 1. Similarly, an exhaust passage 30 formed in cylinder head 22 selectively directs exhaust gas from combustion chamber 16 by means of a pair of exhaust poppet valves 32 positioned in cylinder head 22, only one of which is illustrated in FIG. 1. The opening and closing of valves 30 and 32 may be achieved by a mechanical cam or hydraulic actuation system (not shown) or other motive system in carefully controlled time sequence with the reciprocal movement of piston 24.

At the uppermost, TDC position shown in FIG. 1, piston 24 has just completed its upward compression stroke during which charge air allowed to enter combustion chamber 16 from intake passage 26 is compressed, thereby raising its temperature above the ignition temperature of the engine's fuel. This position is usually considered the zero position commencing the 720 degrees of rotation required to complete four strokes of piston 24. The amount of charge air that is caused to enter combustion chamber 16 and the other combustion chambers of engine 10 maybe increased by providing a pressure boost in engine 10's intake manifold (not shown). This pressure boost may be provided, for example, by a turbocharger (not shown), driven by a turbine powered by engine 10's exhaust or may be driven by engine 10's crankshaft (not shown).

Engine 10 also includes a fuel injector 34, securely mounted in an injector bore 36 formed in cylinder head 22, for injecting fuel at very high pressure into combustion chamber 16 when piston 24 is approaching, at, or moving away from, the TDC position. Injector 34 includes, at its inner end, an injector nozzle assembly 38. Injector 34 includes a plurality of injection orifices 42, formed in the lower end of nozzle assembly 38, for permitting high-pressure fuel to flow from the nozzle cavity of injector 34 into combustion chamber 16 at a very high pressure to induce thorough mixing of the fuel with the high temperature, compressed charge air within combustion chamber 16. It should be understood that injector 34 might be any type of injector capable of injecting high-pressure fuel through a plurality of injector orifices into combustion chamber 16 in the manner described hereinbelow. For example, injector 34 may be a closed nozzle injector or an open nozzle injector. Moreover, injector 34 may include a mechanically actuated plunger housed within the injector body for creating the high pressure during an advancement stroke of the plunger assembly. Alternatively, injector 34 may receive high-pressure fuel from an upstream high-pressure source such as a pump-line-nozzle system including one or more high-pressure pumps and/or a high-pressure accumulator and/or a fuel distributor. Injector 34 may include an electronically actuated injection control valve that supplies high-pressure fuel to the nozzle valve assembly to open a nozzle valve element 38, or controls the draining of high-pressure fuel from the nozzle valve cavity to create a pressure imbalance on nozzle valve element 38. The pressure imbalance thereby causes nozzle valve element 38 to open and close to form an injection event. For example, nozzle valve element 38 may be a conventional spring-biased closed nozzle valve element actuated by fuel pressure, such as disclosed in U.S. Pat. No. 5,326,034, the entire content of which is incorporated by reference. Injector 34 may be in the form of the injector disclosed in U.S. Pat. No. 5,819,704, the entire content of which is hereby incorporated by reference.

The engine of the present invention includes combustion chamber components and features sized, shaped and/or positioned relative to one another, as described hereinbelow, to advantageously direct a fuel spray plume along top surface 25 of piston 24 toward cylinder liner 20 and downward into a piston bowl portion of piston 24. This configuration keeps the hottest portion of the combusting fuel spray plume away from cylinder head 22 and thus reduces the temperature of cylinder head 22 during the combustion process. The aforementioned components and features also promote efficient mixing of the diffusion flame with oxygen available in combustion chamber 16, yielding particulate matter emissions below engineout targets required to meet system-out Environmental Protection Agency (EPA) regulations. In addition, brake-specific nitrogen oxides (BSNOx) are favorably reduced.

Figure 2:
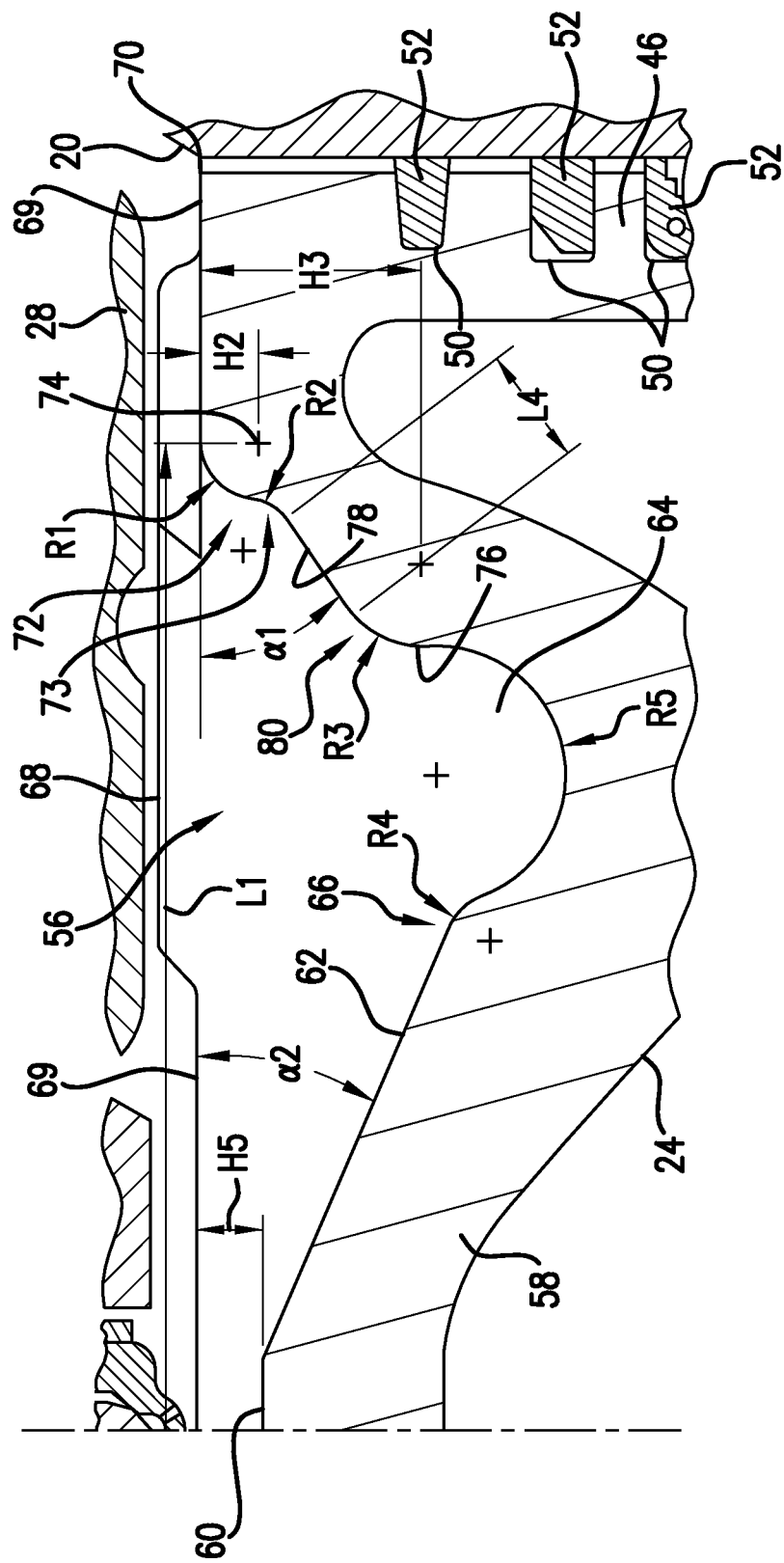
FIG. 2 is a sectional view of a portion of the combustion chamber of FIG. 1.
Figure 3:
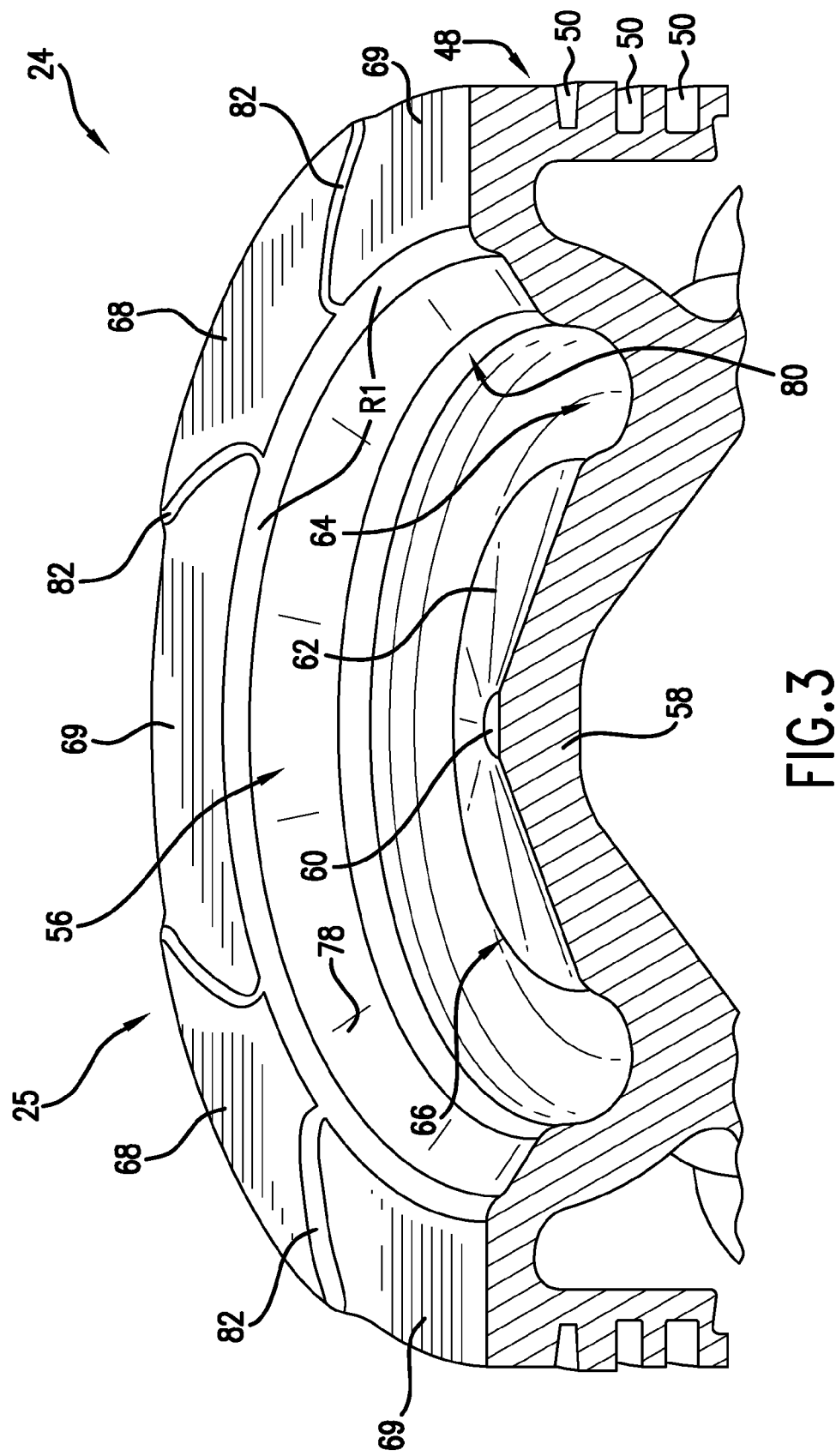
FIG. 3 is a perspective view of a portion of the piston of FIG. 1.

To understand the unique physical characteristics of combustion chamber 16, and more specifically the characteristics of top surface 25 of piston 24, attention is directed to FIGS. 1-3 illustrating the various physical characteristics or parameters that function to achieve the unexpected emission and temperature reduction advantages of the present disclosure. As will be explained in more detail hereinbelow, combinations of physical characteristics and parameters result in different types of advantages. The specific configuration, and more importantly, the critical dimensions and dimensional relationships described hereinbelow result in the improved functional performance of the present disclosure.

More particularly, the upper portion of piston 24 may be referred to as a piston crown 48. This portion of piston 24 includes a depending cylindrical wall 46 including a plurality of peripherally opening, annular grooves 50 for receiving corresponding piston rings or seals 52 designed to form a relatively tight combustion gas seal between piston 24 and the surrounding wall of cylinder liner 20. Piston crown 48 includes top face 25 partially forming combustion chamber 16 and a piston bowl 56 formed by an outwardly opening cavity. Piston bowl 56 includes a projecting portion 58 preferably positioned at or near the center of piston bowl 56. Projection 58 includes a distal end 60 positioned at the center of piston bowl 56 and thus positioned along an axis of reciprocation of piston 24. Distal end 60 is positioned at a depth H5 from an inner surface of piston or valve pockets 69. Depth H5 is preferably in the range of 3 millimeters to 6 millimeters. Projecting portion 58 also includes a flat, frustoconically shaped inner floor portion 62. Floor portion 62 extends axially inward from projecting portion 58 toward the BDC position of piston 24 or the crankshaft (not shown) of engine 10 at an inner floor angle α2 in the range of 21-25 degrees, and preferably at an angle α2 of 23 degrees, from a plane perpendicular to the axis of reciprocation of piston 24 as shown in FIG. 1. Inner floor portion 62 also extends radially outward from projecting portion 58 or radially outward from a central axis of piston 24.

Piston bowl 56 includes an inwardly extending annular outer bowl portion 64 including a radius R5. Positioned between, and at the annular interface of, floor portion 62 and outer bowl portion 64 is an annular ski jump feature 66 including a radius R4 that is tangential to floor portion 62 and to outer bowl portion 64. Top face 25 of piston 24 also includes an uppermost surface portion 68 extending generally perpendicularly to the axis of reciprocation of piston 24 and about the periphery of piston 24. Also located in top face 25 of piston 24 is a plurality of valve pockets 69. Each valve pocket 69 extends inwardly from a peripheral edge 70 positioned at a junction of cylindrical wall 46 and top face 25 of piston 24. The plurality of valve pockets 69 separates uppermost surface portion 68 into a plurality of raised islands or platforms. About the periphery of each valve pocket 69 is a rolled edge 82 including a radius, which is a radius R1 in the transition between valve pocket 69 and piston bowl 56. Located between valve pocket 69 and outer bowl portion 64 is a compound radius 72, which includes radius R1 and a kick-up lip 73 including a radius R2. Radius R1 has a center 74 located a radial distance L1 from the center of piston 24 and a longitudinal or axial distance H2 inwardly from the inner surface of valve pocket 69, which is equal to radius R1. Radius R2 extends tangentially to radius R1 and tangentially to an annular outer floor portion 78 of piston bowl 56, joining outer floor portion 78 to compound radius 72. Outer floor portion 78 is a flat, frustoconically shaped portion extending radially inward toward the center axis of piston 24 at an angle α1 to a plane perpendicular to the axis of reciprocation of piston 24. Outer floor portion has a length L4. An annular spray-targeting lip or feature 80 is characterized by radius R3 located at a depth H3 inward from valve pocket 69. Radius R3 is tangential to outer floor portion 78. To prevent an undercut in piston bowl 56, a frustoconical segment 76 may extend between outer piston bowl 64 and radius R3.

The various features described hereinabove are positioned in certain relationships to each other in the exemplary embodiment. In the axial direction from the planar surface of valve pockets 69, the center of radius R4 is furthest inward or axially distant from the planar surface of valve pockets 69. The center of radius R3 is between the center of radius R4 and the planar surface of valve pockets 69. The center of radius R5 is axially between the center of radius R3 and the center of radius R4. The center of radius R1 is axially further than the center of radius R2 from the planar surface of valve pockets 69. The axial position of the center of radius R3 and the center of radius R1 means that axial distance H3 is larger than axial distance H2. Axial distance H5 is between axial distance H2 and H3 in the exemplary embodiment, but axial distance H5 may be less than distance H2 in other embodiments.

In a radial direction from the central axis of piston 24, the center of radius R5 is positioned between the central axis of piston 24 and the center of radius R1. The center of radius R4 is positioned radially between the central axis of piston 24 and the center of radius R5. The center of radius R3 is radially between the center or radius R5 and the center of radius R1. The center of radius R2 is radially between the center of radius R3 and the center of radius R1.

It should be apparent from the description hereinabove that the features of piston bowl 56 axially inward from the surface of valve pockets 69 are concentric with the central axis of piston 24, which is also the central axis of piston bowl 56. These features may also be described as annular about the central axis of piston 24. Because of the annular nature of the features of piston bowl 56 inward from the surface of valve pockets 69, piston bowl 56 is symmetric about the central axis of piston 24 at all locations in piston bowl 56 that are axially inward from the surface of valve pockets 69. Furthermore, piston 24 includes four valve pockets 69 positioned in piston crown 48 and these four valve pockets 69 are uniformly spaced about the top of piston crown 48. Thus, piston crown 48 is symmetric about any axial plane that includes the central axis of piston 24.

The benefit of this configuration is in the way a fuel plume from fuel injector 34 is guided and combusted within combustion chamber 16. More specifically, the configuration of outer floor portion 78 and radius R1 of compound radius 72 enables a reduction in heat transferred to cylinder head 22. Furthermore, the configuration of ski jump 66 radius R4, radius R5 of outer bowl portion 64, spray-targeting lip or feature 80, and radius R2 of compound radius 72 enables smoke, dry particulate or soot control and low fuel consumption.

The features described hereinabove need to comply with the following dimensions and relationships in addition to previously described dimensions and relationships. As previously described, the edge of each valve pocket 69 has a radius where edge 82 meets uppermost surface portion 68 and where pocket 69 meets piston bowl 56. This radius is R1 at the junction with piston bowl 56. The radius of edge 82 is equal to the axial distance from valve pocket 69 to uppermost surface 68. Outer floor portion 78 has length L4 positioned at an angle α1 with respect to the planar surface of valve pocket 69.

In the exemplary embodiment, length L4 and radius R3 meet the requirements of equation (1) and angle α1 meets the condition of equation (2).

$$0.2 \leq L4/R3 \leq 3.0 \quad \text{(Equation 1)}$$

$$\alpha 1 < 60 \text{ degrees} \quad \text{(Equation 2)}$$

As previously described, ski jump feature 66 includes radius R4 and outer bowl portion 64 includes radius R5. Radius R4 and radius R5 meet the requirements of equation (3).

$$2.5 \leq R5/R4 \leq 5.0 \quad \text{(Equation 3)}$$

Spray-targeting feature 80 includes radius R3 with a center of radius that is positioned at depth H3 from valve pocket surface 69. Compound radius 72 includes radius R1 that has a center of radius located radial distance L1 from the axial or longitudinal center of piston 24. Note that radial distance L1 represents the radius of piston bowl 56, making radial distance L1 half the width of piston bowl 56. Depth H3 and radial distance L1 meet the requirements of equation 4.

$$0.15 \leq H3/L1 \leq 0.3 \quad \text{(Equation 4)}$$

As will be seen from the description hereinbelow, equations (1), (2) and (4) combine to achieve reduced heat transfer to cylinder head 20 and equations (1), (3) and (4) combine to control smoke, soot or particulate control and fuel consumption or efficiency.

Figure 4:
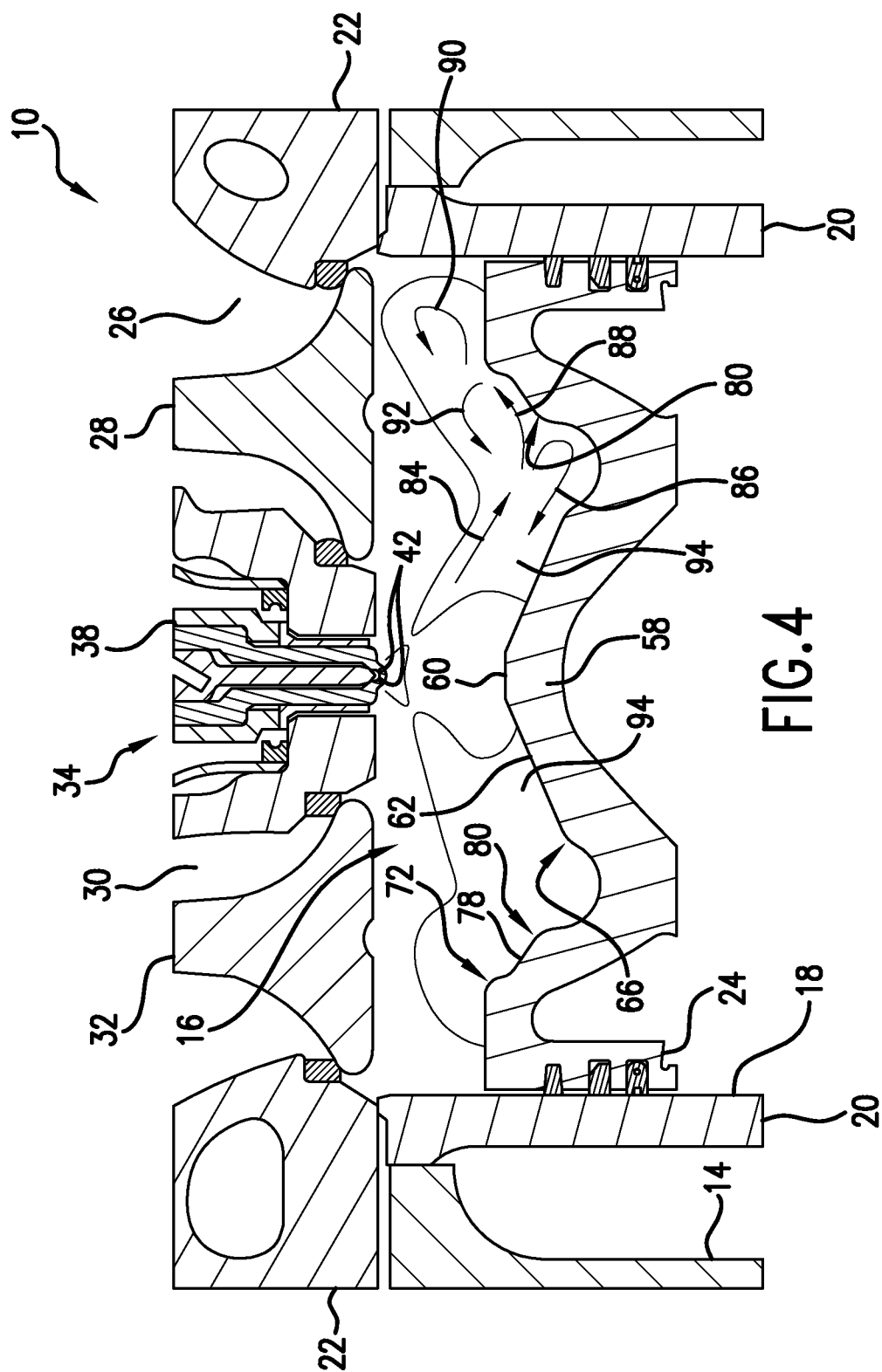
FIG. 4 is a sectional view similar to FIG. 2, showing the location of the highest temperatures in the combustion chamber during the closed combustion phase of the engine cycle.

Referring now to FIG. 4, which shows piston 24 moving in a downward or inward stroke toward the engine crankshaft, the benefit of the present disclosure described hereinabove is illustrated. A fuel plume from fuel injectors 42 flows along a path 84 across piston bowl 56 toward spray-targeting feature 80 in piston bowl 56, becoming a diffusion plume as the fuel plume interacts with air from intake valve(s) 28. Radius R3 of spray-targeting feature or lip 80 causes the diffusion plume to bifurcate at spray-targeting lip 80, directing a portion of the diffusion plume along a path 86 into outer bowl portion 64 while the remainder flows along a path 88 toward cylinder head 22. When the diffusion plume reaches compound radius 72, the configuration and dimensions of compound radius 72 cause the diffusion plume to be bifurcated again, guiding a portion of the diffusion plume toward cylinder liner 20 along a path 90, while the remainder of the diffusion plume is directed or recirculated along a path 92 back into piston bowl 56. Outer floor portion 78, which has a length L4 that forms a ratio L4/R3 in the range of 0.2 to 3.0, delays the progression of the diffusion plume toward cylinder head 22, which serves to lower heat transfer to cylinder head 22. The reduced heat transfer occurs because piston 24 is moving in a downward stroke and the gas in cylinder 18 between piston 24 and cylinder head 22 is expanding. Hence, the bifurcation of the diffusion plume near cylinder head 22 has the advantage of preventing excessive heat transfer to cylinder head 22 while using available oxygen within recirculation zones to improve combustion of fuel in the diffusion plume. The rollover radius or feature R1 of compound radius 72 and along edges 82 of valve pocket 69 assists in ensuring a smooth rollover of the diffusion plume onto valve pockets 69 and uppermost surface portion 68. In the absence of rollover feature R1 and rolled edges 82, at least some of the diffusion plume would separate from piston 24 and flow toward cylinder head 22, resulting in higher cylinder head temperatures. In addition to the aforementioned temperature benefits, radius R5 of outer bowl portion 64 and radius R4 of the ski-jump feature or lip 66 promotes an upward turbulence to burn out soot-rich region 94 in combustion chamber 16 by concentrating the highest temperatures in combustion chamber 16 along piston bowl 56.

Radius R5 and radius R4, which form ratio R5/R4 in the range of 2.5 to 5.0, work with spray-targeting feature 80, defined by radius R3 and axial distance H3, and radius R2 of compound radius 72 to reduce smoke, soot or particulates as well as improving fuel consumption and efficiency. As previously noted, H3 and L1 form the ratio H3/L1 in the range of 0.15 to 0.3.

Testing of the configuration of the present disclosure indicates a temperature reduction in cylinder head 22 in the range of 10 to 15 degrees Fahrenheit as compared to conventional piston designs, depending on engine speed. This configuration also reduces brake specific NOx (BSNOx) by 14% to 17% with an increase in engine out brake specific dry particulate matter (BSDPM) of 11% to 17% and an increase in brake specific fuel consumption of approximately 0.8%. However, the increase in dry particulate matter, or soot, remains within the EPA regulated guidelines and can be controlled further by aftertreatment systems. In addition, the small decrease in fuel consumption may be compensated by increasing the compression ratio of the piston to 18:1, which achieves 1.5% lower fuel consumption than a previous comparable design, thus increasing fuel consumption.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. An internal combustion engine, comprising:
an engine body;
a cylinder head attached to the engine body;
a combustion chamber positioned between the cylinder head and the engine body; and
a piston, including a piston crown that forms a portion of the combustion chamber, located in the engine body, the piston crown including a central axis, a plurality of valve pockets arranged about the periphery of the piston crown in a plane perpendicular to the central axis, an uppermost surface portion, and a piston bowl positioned radially inward from the valve pockets, the piston bowl including: a compound radius including a radius R1, radius R1 including a center of radius at a radial distance L1 from the central axis, radius R1 connected to and extending inwardly from the valve pockets to form a smooth transition between the valve pockets and the piston bowl; a frustoconical outer floor portion connected to the compound radius, the frustoconical outer floor portion extending a distance L4 from the compound radius at an angle α1 to a plane perpendicular to the central axis; an annular outer bowl portion including a radius R5; and a spray-targeting feature positioned between the annular outer bowl portion and the frustoconical outer floor portion and including a radius R3 with a center of radius located at an axial distance H3 from the valve pockets, wherein each of the valve pockets includes a rolled edge extending between the valve pocket and the uppermost surface, the rolled edge including a radius to form a smooth transition between the valve pocket and the uppermost surface.

2. The internal combustion engine of claim 1, wherein a ratio L4/R3 is in the range of 0.2 to 3.0.

3. The internal combustion engine of claim 2, wherein a ratio of H3/L1 is in the range of 0.15 to 0.3.

4. The internal combustion engine of claim 3, wherein α1 is less than 60 degrees.

5. The internal combustion engine of claim 1, wherein a ratio of H3/L1 is in the range of 0.15 to 0.3.

6. The internal combustion engine of claim 5, wherein α1 is less than 60 degrees.

7. The internal combustion engine of claim 1, wherein α1 is less than 60 degrees.

8. The internal combustion engine of claim 1, the piston bowl further including a ski jump feature located radially inward from the annular outer bowl portion, the ski jump feature tangentially connected to the annular outer bowl portion and including a radius R4.

9. The internal combustion engine of claim 8, wherein a ratio R5/R4 is in the range of 2.5 to 5.0.

10. The internal combustion engine of claim 9, wherein a ratio L4/R3 is in the range of 0.2 to 3.0.

11. The internal combustion engine of claim 10, wherein a ratio of H3/L1 is in the range of 0.15 to 0.3.

12. The internal combustion engine of claim 11, wherein α1 is less than 60 degrees.

13. The internal combustion engine of claim 9, wherein a ratio of H3/L1 is in the range of 0.15 to 0.3.

14. The internal combustion engine of claim 13, wherein α1 is less than 60 degrees.

15. The internal combustion engine of claim 9, wherein α1 is less than 60 degrees.

16. An internal combustion engine, comprising:
an engine body;
a cylinder head attached to the engine body;
a combustion chamber positioned between the cylinder head and the engine body; and
a piston, including a piston crown that forms a portion of the combustion chamber, located in the engine body, the piston crown including a central axis, an uppermost surface portion, a plurality of valve pockets arranged about the periphery of the piston crown in a plane perpendicular to the central axis, and a piston bowl positioned radially inward from the valve pockets, the piston bowl including: a compound radius including a radius R1, radius R1 including a center of radius at a radial distance L1 from the central axis, radius R1 connected to and extending inwardly from the valve pockets to form a smooth transition between the valve pockets and the piston bowl; a frustoconical outer floor portion connected to the compound radius, the frustoconical outer floor portion extending a distance L4 from the compound radius at an angle α1 to a plane perpendicular to the central axis; an annular outer bowl portion; and a spray-targeting feature positioned between the annular outer bowl portion and the frustoconical outer floor portion and including a radius R3 with a center of radius located at an axial distance H3 from the end surface, each of the valve pockets including a rolled edge extending between the valve pocket and the uppermost surface, the rolled edge including a radius to form a smooth transition between the valve pocket and the uppermost surface;
wherein a ratio L4/R3 is in the range of 0.2 to 3.0 and a ratio H3/L1 is in the range of 0.15 to 0.3.

17. The internal combustion engine of claim 16, wherein α1 is less than 60 degrees.

18. An internal combustion engine, comprising:
an engine body;
a cylinder head attached to the engine body;
a combustion chamber positioned between the cylinder head and the engine body; and
a piston, including a piston crown that forms a portion of the combustion chamber, located in the engine body, the piston crown including a central axis, an uppermost surface portion, a plurality of valve pockets arranged about the periphery of the piston crown in a plane perpendicular to the central axis, and a piston bowl positioned radially inward from the valve pockets, the piston bowl including: a compound radius connected to and extending inwardly from the valve pockets to form a smooth transition between the valve pockets and the piston bowl; a frustoconical outer floor portion connected to the compound radius, the frustoconical outer floor portion extending from the compound radius at an angle α1 to a plane perpendicular to the central axis; an annular outer bowl portion including a radius R5; a spray-targeting feature positioned between the annular outer bowl portion and the frustoconical outer floor portion; and a ski jump feature positioned between the annular outer bowl portion and the central axis and connected to the annular outer bowl portion, the ski jump feature including a radius R4, each of the valve pockets including a rolled edge extending between the valve pocket and the uppermost surface, the rolled edge including a radius to form a smooth transition between the valve pocket and the uppermost surface;
wherein a ratio R5/R4 is in the range of 2.5 to 5.0.

19. The internal combustion engine of claim 18, wherein angle α1 is less than 60 degrees.

20. The internal combustion engine of claim 19, wherein the frustoconical outer floor portion extends radially outward a distance L4 at an angle α1 and the spray-targeting feature has a radius R3 and a ratio L4/R3 is in the range of 0.2 to 3.0.

* * * * *